US011047873B2

(12) United States Patent
Calantoni et al.

(10) Patent No.: US 11,047,873 B2
(45) Date of Patent: Jun. 29, 2021

(54) STEREO PARTICLE IMAGE VELOCIMETRY (PIV) SYSTEM FOR LONG TERM COASTAL OCEAN DEPLOYMENT

(71) Applicant: The Government of the United States of America, as represented by the Secretary of the Navy, Arlington, VA (US)

(72) Inventors: Joseph Calantoni, Diamondhead, MS (US); Edward Braithwaite, Covington, LA (US); Callum Gray, Ann Arbor, MI (US); Sean Griffin, Slidell, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 96 days.

(21) Appl. No.: 16/428,781

(22) Filed: May 31, 2019

(65) Prior Publication Data

US 2019/0376998 A1 Dec. 12, 2019

Related U.S. Application Data

(60) Provisional application No. 62/678,861, filed on May 31, 2018.

(51) Int. Cl.
*G01P 5/20* (2006.01)
*G06T 7/292* (2017.01)
(Continued)

(52) U.S. Cl.
CPC ............ *G01P 5/20* (2013.01); *G01P 5/001* (2013.01); *G06T 7/246* (2017.01); *G06T 7/292* (2017.01); *G06T 2207/30181* (2013.01)

(58) Field of Classification Search
None
See application file for complete search history.

(56) References Cited

U.S. PATENT DOCUMENTS 4,030,830 A * 6/1977 Holly ................. G01B 11/30
356/489
5,000,566 A * 3/1991 Kuppenheimer, Jr. ... G01P 5/20
340/974

(Continued)

OTHER PUBLICATIONS

Gray et al., "An Analysis of the Scanning Beam PIV Illumination System," Measurement Science and Technology, vol. 2, No. 8, pp. 717-724, dated Mar. 13, 1991.
(Continued)

*Primary Examiner* — Peter J Macchiarolo
*Assistant Examiner* — Jermaine L Jenkins
(74) *Attorney, Agent, or Firm* — US Naval Research Laboratory; William P. Ladd

(57) ABSTRACT

Systems and methods are provided for making in-situ measurements of the sea bed 3 component fluid velocity field and sediment motion across a range of real ocean conditions using particle image velocimetry (PIV). A PIV system in accordance with an embodiment of the present disclosure can include a camera to capture images of the particles in motion, a laser to generate a laser sheet for illuminating the particles, and a synchronizer to act as an external trigger for the laser and the camera.

20 Claims, 17 Drawing Sheets

(51) Int. Cl.
    *G06T 7/246*         (2017.01)
    *G01P 5/00*          (2006.01)

(56) References Cited

U.S. PATENT DOCUMENTS

| | | | | |
|---|---|---|---|---|
| 7,911,591 | B2* | 3/2011 | Montgomery | G01P 5/20 |
| | | | | 356/28 |
| 8,160,351 | B2* | 4/2012 | Sandstrom | G03F 1/84 |
| | | | | 382/149 |
| 10,895,843 | B2* | 1/2021 | Hong | G03H 1/0866 |

OTHER PUBLICATIONS

Doron P, Bertuccioli L, Katz J, Osborn TR, "Turbulence Characteristics and Dissipation Estimates in the Coastal Ocean Bottom Boundary Layer from PIV Data." Journal of Physical Oceanography 31:2108-2134, (2000).

Katija, K., Dabiri, J.O., "In situ field measurements of aquatic animal-fluid interactions using a self-contained underwater velocimetry apparatus (SCUVA)," Limnology and Oceanography: Methods 6, 162-171, (2008).

Liao, Q., Bootsma, H.A., Xiao, J., Klump, J. V., Hume, A., Long, M.H., Berg, P., "Development of an in situ Underwater Particle Image Velocimetry (UWPIV) System," Limnology and Oceanography: Methods, v.7, p. 169-184, (2009).

Kremien, M., Shavit, U., Mass, T., Genin, A., "Benefit of pulsation in soft corals," Proceedings of the National Academy of Sciences, DOI: 10.1073/pnas.1301826110, (2013).

* cited by examiner

STEREO PARTICLE IMAGE VELOCIMETRY (PIV) SYSTEM FOR LONG TERM COASTAL OCEAN DEPLOYMENT

CROSS REFERENCE TO RELATED APPLICATIONS

This application claims the benefit of U.S. Provisional Patent Application No. 62/678,861, filed on May 31, 2018, which is incorporated by reference herein in its entirety.

FIELD OF THE DISCLOSURE

This disclosure relates to velocimetry, including particle image velocimetry.

BACKGROUND

Simulations for conducting experiments involving hydrodynamic phenomena in laboratories have disadvantages over experiments that measure hydrodynamic phenomena in nature. For example, laboratory experiments in flow tunnels and wave flumes simplify and scale down the sediment dynamics and hydrodynamics that occur in nature. Further, some hydrodynamic phenomena are difficult or impossible to simulate in a laboratory such as non-linear boundary layer effects such as stokes drift and boundary layer streaming, non-co-linear wave-current interactions, large-scale morphodynamics (e.g., sand bar migration), etc.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1A:
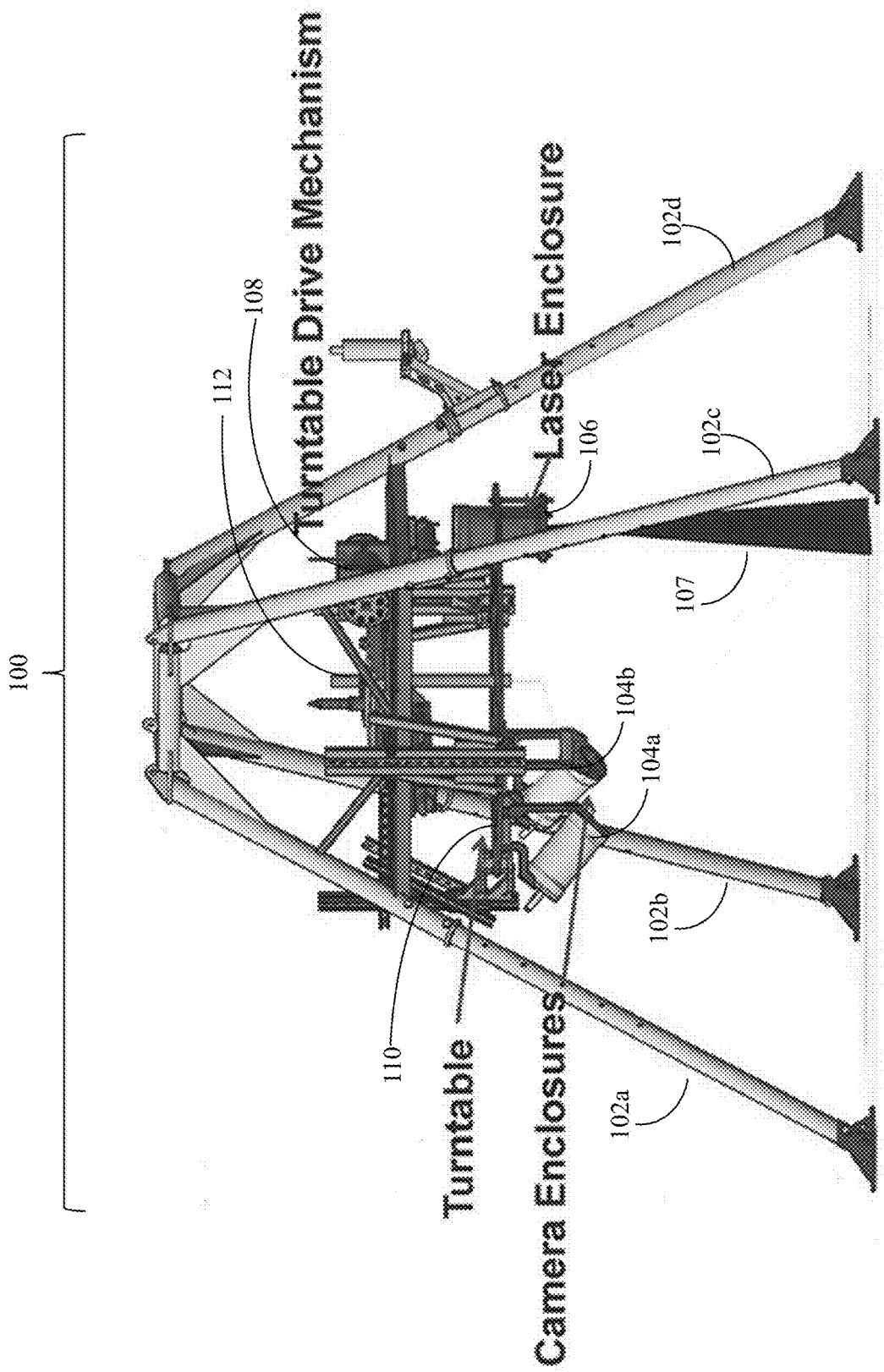
FIG. 1A is a diagram of an exemplary particle image velocimetry (PIV) system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Particle image velocimetry (PIV) is a non-contact technique for characterizing the flow of fluids that can be used to gather data from hydrodynamic phenomena in nature. For example, a fluid can be populated with particles that are assumed to follow the flow dynamics of the fluid. The motion of the particles can then be traced to determine the speed and direction of the fluid flow.

Embodiments of the present disclosure provide systems and methods for PIV that enable making in-situ measurements of the sea bed 3 component fluid velocity field and sediment motion across a range of real ocean conditions. A PIV system in accordance with an embodiment of the present disclosure can include a camera to capture images of the particles in motion, a laser to generate a laser sheet for illuminating the particles, and a synchronizer to act as an external trigger for the laser and the camera.

Systems and methods according to embodiments of the present disclosure have several advantages over prior techniques. For example, embodiments of the present disclosure provide a capability for observation of near bed turbulence and capture of particle motion in the natural environment. Embodiments of the present disclosure couples the laboratory capabilities of stereo PIV into a "hardened" system that can be deployed in the ocean environment from moderate to strong storm conditions. Embodiments of the present disclosure are capable of near continuous and remote operation for long periods of time (e.g., weeks to months). Embodiments of the present disclosure are equipped with a rotating plate to readily re-align the measurement plane with the near bed flow. Embodiments of the present disclosure enable detailed and long term observations of near bed flow and turbulence driving seafloor evolution around pipes, cables, mines, and other objects of interest.

Embodiments of the present disclosure can use naturally occurring particles suspended in sea water to measure time resolved velocity fields with the same fidelity as lab experiments without altering or obscuring flow in the velocity fields. By reducing dimensions of enclosed objects, embodiments of the present disclosure cause minimal drag. Embodiments of the present disclosure enable PIV in a large field of view (e.g., 60 cm×40 cm). Embodiments of the present disclosure provide a laser and camera rig that is rotatable to align the measurement plane with the principle direction of flow.

Embodiments of the present disclosure provide a PIV system that is remotely controllable from shore (e.g., in an embodiment, at a distance of 1-2 km). Embodiments of the present disclosure can operate at depths of 10-15 meters in typical conditions (calm to storm) and can remain in-situ for periods of months (e.g., in an embodiment, with diver maintenance/intervention). Embodiments of the present disclosure can tolerate ship conditions and the journey to the sea bed, are watertight, can tolerate hot ship deck/cold undersea temps, resist bio-fouling, and limit galvanic corrosion.

2. Exemplary PIV System

FIG. 1A is a diagram of an exemplary particle image velocimetry (PIV) system 100 in accordance with an embodiment of the present disclosure. PIV system 100 can also be referred to herein as a quadpod. In FIG. 1A, legs 102 are used to support the overall structure of PIV system 100. In an embodiment, legs 102 can have an expandable height and can be expanded to be approximately 3.3 m high. While four legs 102 are shown in FIG. 1A, it should be understood that a variety of numbers of legs (e.g., three, five, or more) can be used in accordance with embodiments of the present disclosure.

In FIG. 1A, camera enclosures 104 are used to house cameras for capturing images of particles in motion. In an embodiment, camera enclosures 104 include cameras with remote control lens focus and apertures. While two camera enclosures are shown in FIG. 1A, it should be understood that a variety of numbers of cameras and/or camera enclosures (e.g., one, three, four, or more) can be used in accordance with embodiments of the present disclosure.

In FIG. 1A, laser enclosure 106 is used to protect a laser (e.g., a continuous wave (CW) laser) that generates a laser beam. In an embodiment, the laser enclosed by laser enclosure 106 generates a laser sheet 107 that illuminates particles to be measured in a medium (e.g., water) surrounding PIV system 100. In an embodiment, laser sheet 107 is a two-dimensional (2D) laser sheet. While laser sheet 107 is described herein as a 2D laser sheet, it should be understood that laser sheets other than 2D laser sheets can be used. For example, in an embodiment, a three dimensional laser beam can be generated. Further, in an embodiment, one or more laser beams can be generated instead of a laser sheet. In an embodiment, laser enclosure 106 encloses a laser scanner with optical pickup and a pulse conditioner. In an embodiment, laser enclosure 106 is used to enclose a 5-Watt gateable diode pumped solid state (DPSS) laser (e.g., 532 nm) and scanner mounted so that the beam is folded back onto a 20 facet rotating mirror. While one laser enclosure 106 is shown in FIG. 1A, it should be understood that a variety of numbers of lasers and/or laser enclosures can be used in accordance with embodiments of the present disclosure.

In FIG. 1A, a control module enclosure 108 is used to protect an enclosed control module that is used to gather PIV data. In an embodiment, the control module enclosed by control module enclosure 108 provides control, timing, and power management. In an embodiment, the control module enclosed by control module enclosure 108 ensures that all components of PIV system 100 power up in a specific order that ensures that a simple power cycle returns the system to a usable state. In an embodiment, the control module enclosed by control module enclosure 108 ensures that the laser enclosed by laser enclosure 106 powers up last to ensure that the mirror(s) inside laser enclosure 106 are not damaged.

In an embodiment, the control module enclosed by control module enclosure 108 includes a synchronizer that triggers lasers enclosed by laser enclosures 106 and cameras enclosed by camera enclosures 104. In an embodiment, the control module enclosed by control module enclosure 108 ensures that all components power up in a specific order to ensure that a simple power cycle returns the system to a usable state. In an embodiment, an umbilical cord including power and data (e.g., using a fiber optic cable) is coupled to the system of FIG. 1A (e.g., in an embodiment, to the control module enclosed by control module enclosure 108). In an embodiment, the umbilical cord is a 1.5 km umbilical cable coupled to a remote command center (e.g., in an embodiment, a mobile command center on a ship, a pier, or on shore). While an umbilical cable is described herein to transfer data, it should be understood that embodiments of the present disclosure can also use other techniques to transfer data to PIV system 100 (e.g., via wireless communications, satellite communications, etc.). While one control module enclosure 108 is shown in FIG. 1A, it should be understood that a variety of numbers of control modules and/or control module enclosures can be used in accordance with embodiments of the present disclosure.

In an embodiment, camera enclosures 104 and/or laser enclosure 106 can be secured to a turntable 110 (e.g., via posts) for ease of assembly, rigidity and adjustment. In an embodiment, control module enclosure 108 can also be secured to turntable 110. In an embodiment, turntable 110 can be moved by turntable drive mechanism 112. In an embodiment, turntable drive mechanism is a powered drive mechanism that is controlled by the control module enclosed by control module enclosure 108. In an embodiment, turntable drive mechanism 112 can be configured to rotate turntable 110 in three dimensions. In an embodiment, turntable drive mechanism 112 can be configured to rotate turntable 110 in two dimensions.

In an embodiment, camera enclosures 104, laser enclosure 106, and control module enclosure 108 use pressure vessels (PVs) to protect respective components inside enclosures 104, 106, and 108 from an underwater environment in moderate to strong storm conditions. In an embodiment, the enclosures 104, 106, and 108 have dimensions that are minimized to reduce drag. In an embodiment, these PVs are made of bottles of nickel aluminum bronze (e.g., C95500 Nickel Aluminum Bronze). In an embodiment, nickel aluminum bronze bottles provide a compromise between anti-fouling properties, galvanic properties, and corrosion resistance. In an embodiment, enclosures 104, 106, and 108 include aluminum circular plates with anodes and end caps with cylinder flanges designed to incorporate double O rings. In an embodiment, enclosures 104, 106, and 108 include power, triggering, and control lines via pass-through connectors. In an embodiment, enclosures 104, 106, and 108 are evacuated using 20-25 inches of mercury (Hg) and backfilled dry using dinitrogen ($N_2$) to avoid internal condensation. In an embodiment, camera windows for cameras enclosed by camera enclosures 104 and laser windows for the laser enclosed by laser enclosure 106 are Corning 7980 windows.

Figure 1B:
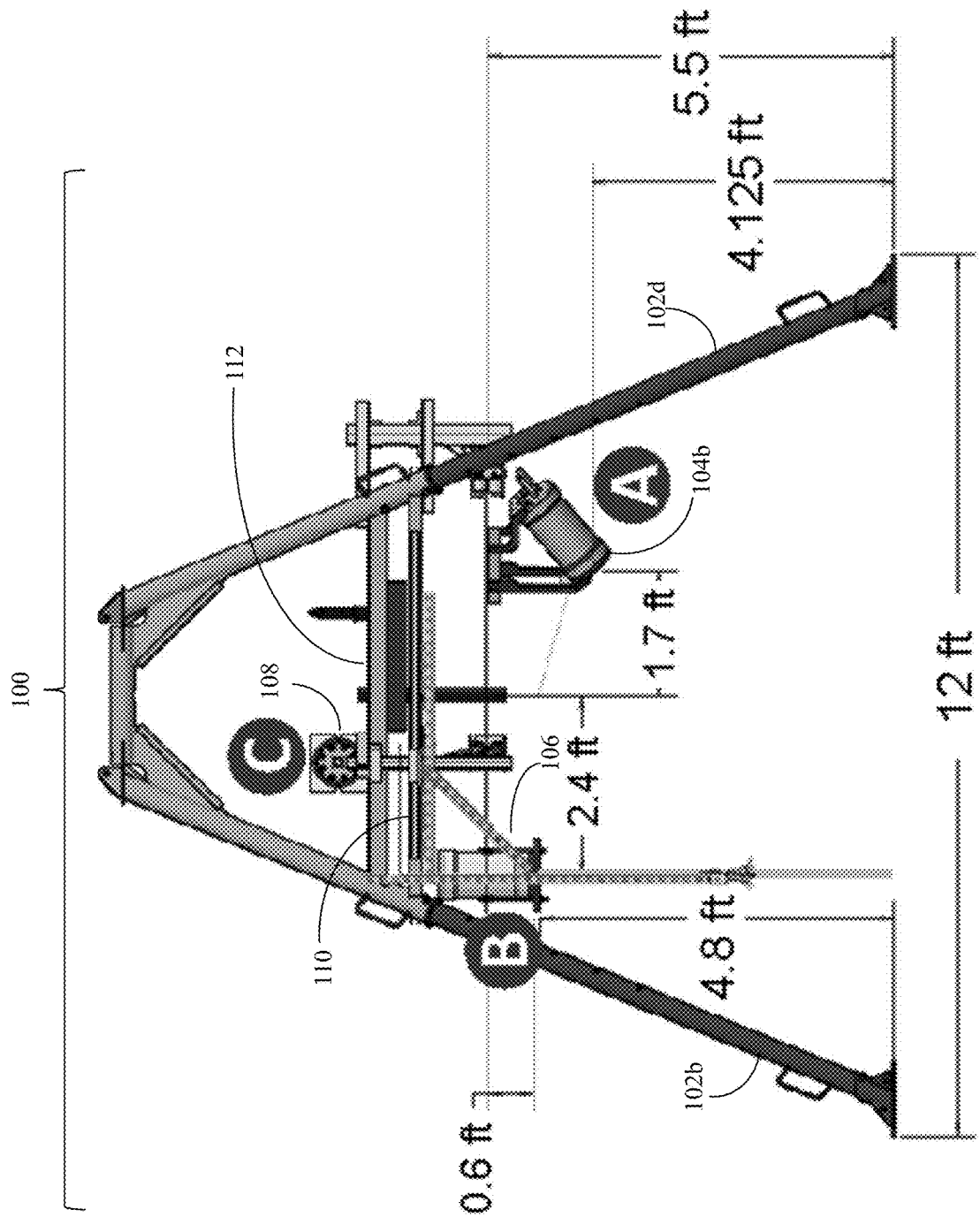
FIG. 1B is cross-section diagram showing a back view of an exemplary PIV system in accordance with an embodiment of the present disclosure.
Figure 1C:
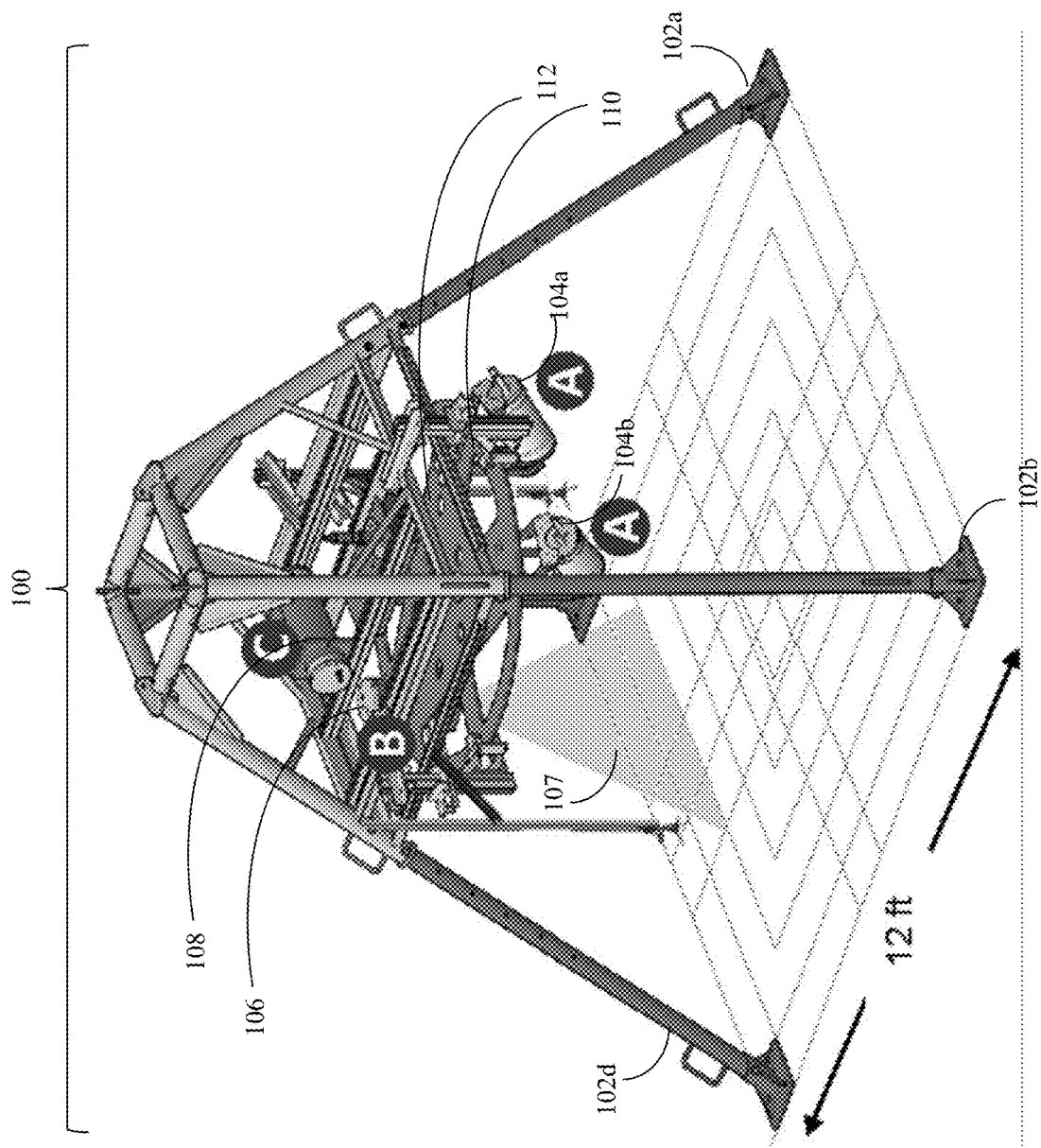
FIG. 1C is a cross-section diagram showing a side view of an exemplary PIV system in accordance with an embodiment of the present disclosure.
Figure 1D:
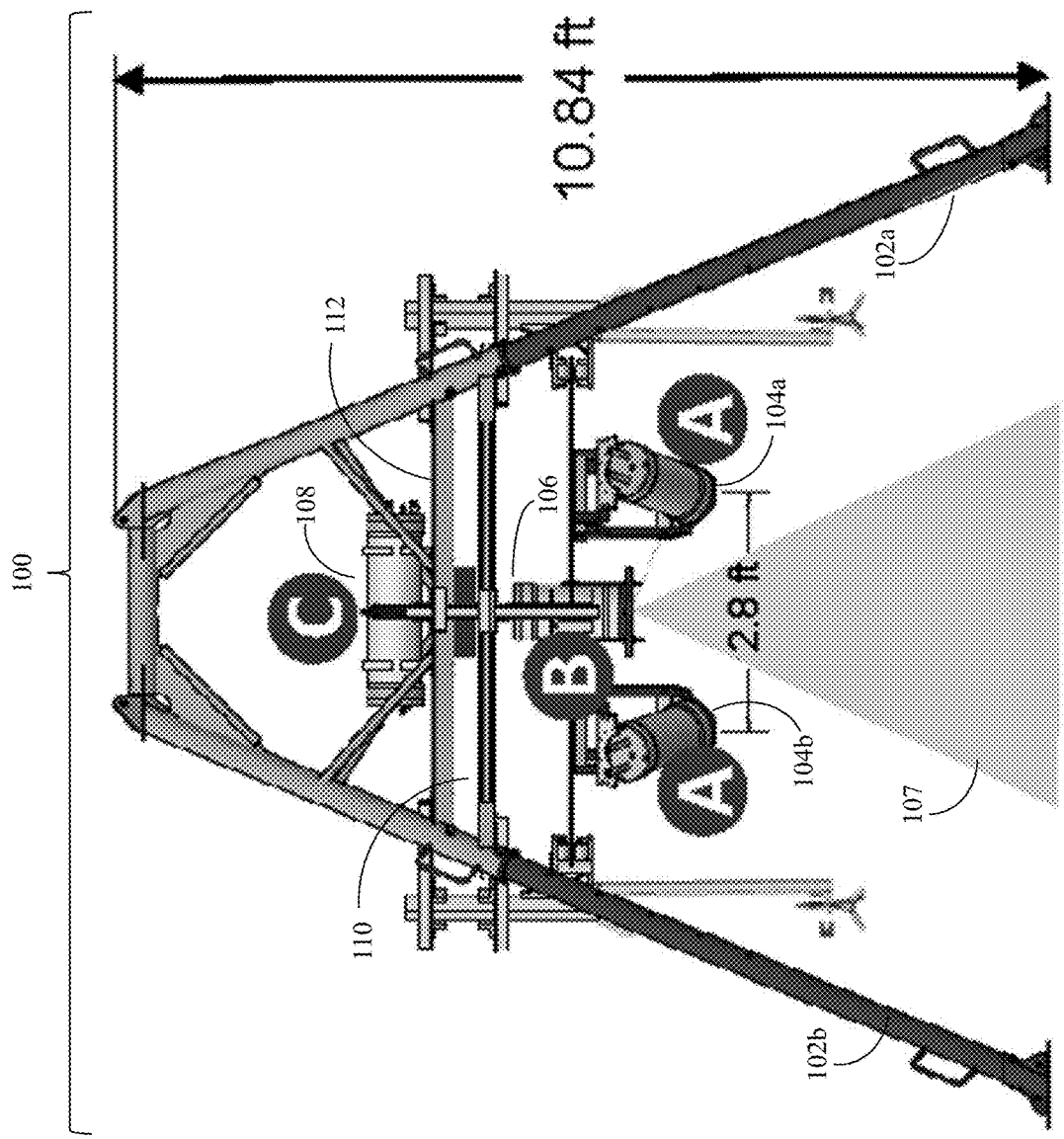
FIG. 1D is a diagram showing a diagonal view of an exemplary PIV system in accordance with an embodiment of the present disclosure.

FIG. 1B is cross-section diagram showing a back view of an exemplary PIV system in accordance with an embodiment of the present disclosure. FIG. 1C is a cross-section diagram showing a side view of an exemplary PIV system in accordance with an embodiment of the present disclosure. FIG. 1D is a diagram showing a diagonal view of an exemplary PIV system in accordance with an embodiment of the present disclosure. Dimensions shown in FIGS. 1B, 1C, and 1D are provided by way of example and are not limiting. It should be understood that embodiments of the present disclosure can use components having a variety of lengths, widths, and heights.

3. Exemplary Control Systems

Figure 2:
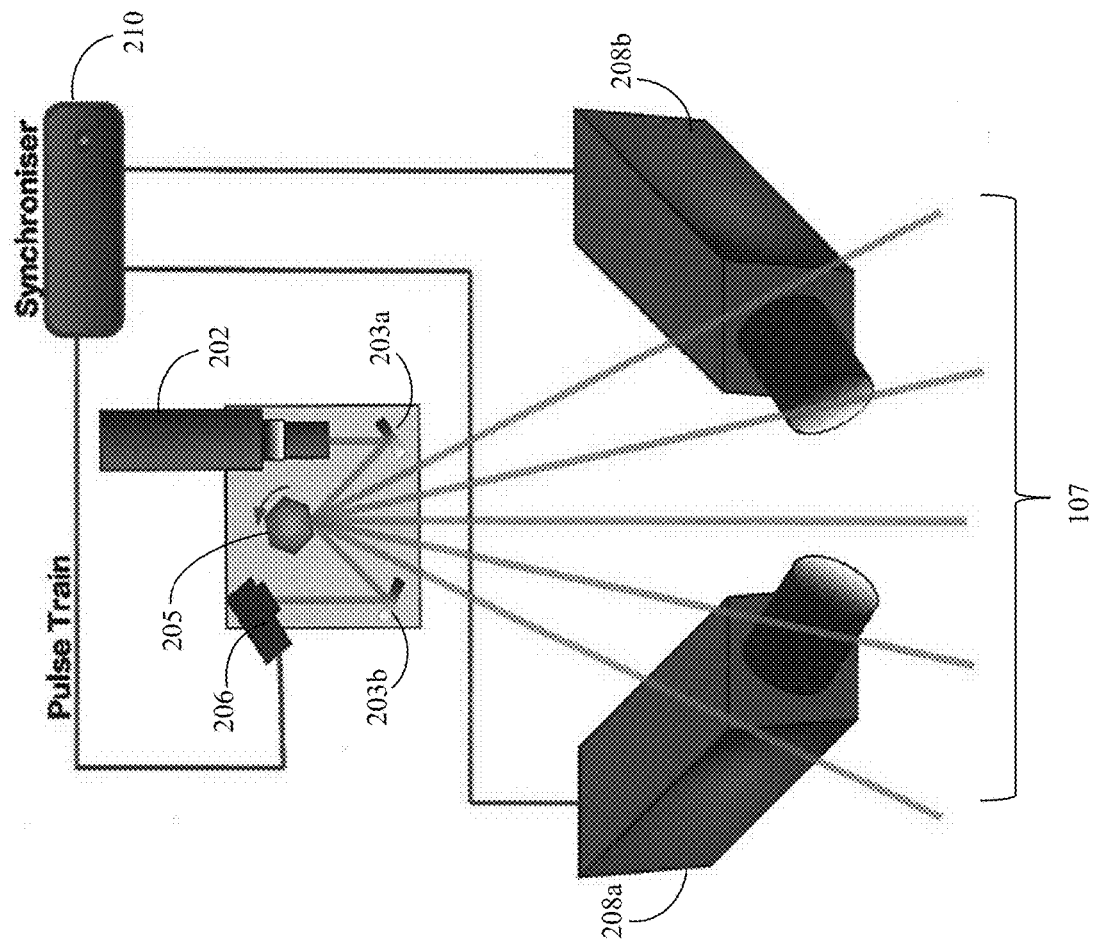
FIG. 2 is a diagram showing how an exemplary synchronizer can synchronize a laser and cameras in accordance with an embodiment of the present disclosure.

FIG. 2 is a diagram showing how an exemplary synchronizer can synchronize a laser and cameras in accordance with an embodiment of the present disclosure. In FIG. 2, laser 202 generates a laser beam that reflects off a first mirror 203a (e.g., in an embodiment, a parabolic mirror) onto a multi-faceted rotating mirror 205. In an embodiment, multi-faceted rotating mirror 205 reflects the laser beam onto a second mirror 203b (e.g., in an embodiment, a parabolic mirror), which reflects the laser beam onto a lens of a sensor device 206 (e.g., in an embodiment, a photodiode). In an embodiment, the laser beam reflected onto second mirror 203b is part of the laser sheet 107 reflected from multi-faceted rotating mirror 205. In an embodiment, laser 202, mirrors 203 and 205, and sensor device 206 are enclosed by laser enclosure 106. In an embodiment, laser 202 is enclosed by laser enclosure 106, and mirrors 203 and 205, and sensor device 206 are not enclosed by laser enclosure 106 but are instead coupled to laser enclosure 106. In an embodiment, successive faces of multi-faceted rotating mirror 205 reflect one or more laser beams that are used to generate laser sheet 107 for illuminating particles to be measured.

In an embodiment, cameras 208 capture images of particles in motion illuminated by laser sheet 107. In an embodiment, cameras 208a is enclosed by camera enclosure 104a, and camera 208b is enclosed by camera enclosure 104b. In an embodiment, laser sheet 107 generates backscatter (e.g., backscatter reflected from tracer particles) and cameras 208 can detect this backscatter (e.g., using sensors within cameras 208) and can generate a plurality of images (e.g., a plurality of flow images) representing this backscatter. In an embodiment, this backscatter is also reflected onto multi-faceted rotating mirror 205 and to sensor device 206 via second mirror 203b. In an embodiment, cameras 208 include embedded controllers. In an embodiment, cameras 208 include aperture and focus lenses that are remotely controllable by synchronizer 210 and/or a control module including synchronizer 210 (e.g., in an embodiment, the control module enclosed by control module enclosure 108). In an embodiment, synchronizer 210 is part of the control module enclosed by control module enclosure 108).

In an embodiment, synchronizer 210 can act as an external trigger for laser 202 and cameras 208. For example, in an embodiment, synchronizer 210 can instruct laser 202 to turn on and/or to generate a laser beam and can instruct cameras 208 to turn on and/or to record information (e.g., to detect backscatter reflected from particles illuminated by laser sheet 107 and to generate images based on the detected backscatter), and synchronizer 210 can synchronize laser 202 and cameras 208. For example, in an embodiment, synchronizer 210 receives a signal from sensor device 206 that is generated by sensor device 206 based on information from the laser beam reflected by mirror 203b, and synchronizer 210 also receives information from cameras 208. Using this information, synchronizer 210 can send instructions to laser 202 and/or cameras 208 (e.g., to alter the laser beam generated by laser 202, to rotate cameras 208, to focus cameras 208, etc.). In an embodiment, synchronizer 210 can also control operation of multi-faceted rotating mirror 205 and/or mirrors 203 (e.g., based on information received from sensor device 206 and/or cameras 208).

In an embodiment, rotation of multi-faceted rotating mirror 205 can be controlled by synchronizer 210 and/or a control module including synchronizer 210 or coupled to synchronizer 210 (e.g., in an embodiment, the control module enclosed by control module enclosure 108). In an embodiment, rotation of first mirror 203a and/or second mirror 203b can also be controlled by synchronizer 210 and/or a control module including synchronizer 210 (e.g., in an embodiment, the control module enclosed by control module enclosure 108). In an embodiment, synchronizer 210 can also control rotation of turntable 110 (e.g., by controlling turntable drive mechanism 112).

4. Exemplary System Embodiments

Figure 3:
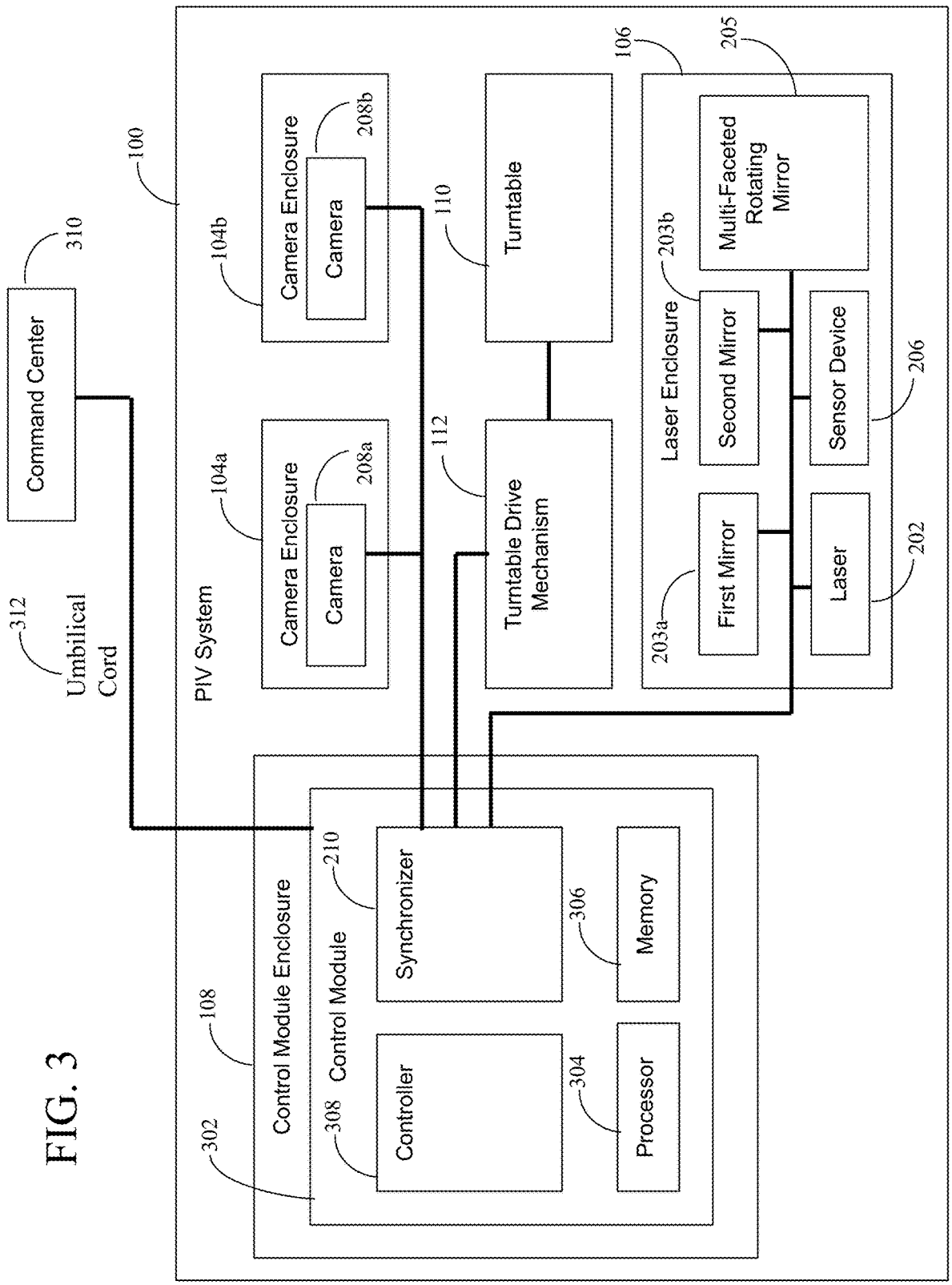
FIG. 3 is an exemplary system diagram showing a PIV system connected to a command center in accordance with an embodiment of the present disclosure.

FIG. 3 is an exemplary system diagram showing a PIV system connected to a command center in accordance with an embodiment of the present disclosure. In FIG. 3, command center 310 is coupled to PIV system 100 via an umbilical cord 312. As discussed above, this umbilical cord can be used to send power to PIV system 100 from command center 310. In an embodiment, umbilical cord 312 can also be used to send data (e.g., via a fiber optic cable in umbilical cord 312) from command center 310 to PIV system 100 and from PIV system 100 to command center 310. For example, in an embodiment, control module 302 can receive information recorded by cameras 208 (e.g., flow images of measured PIV information) and can send this information to command center 310 via umbilical cord 312. In an embodiment, command center 310 is a command center device. For example, in an embodiment, command center 310 can be a general purpose computer or special purpose computer configured to send information to PIV system 100 (e.g., via umbilical cord 312) and to receive information from PIV system 100 (e.g., via umbilical cord 312).

As discussed above, in an embodiment, control module enclosure 108 includes a control module 302. As shown in FIG. 3, control module 302 can include synchronizer 210, a processor 304, and memory 306. As discussed above, in an embodiment, synchronizer 210 can be used to control the operation of cameras 208, turntable drive mechanism 112, and components of laser enclosure 106 (e.g., in an embodiment, first mirror 203a, second mirror 203b, laser 202, sensor device 206, and/or multi-faceted rotating mirror 205).

In an embodiment, control module 302 can also include a controller 308. In an embodiment, controller 308 is a controller of a personal computer (PC) integrated into control module 302. In an embodiment, controller 308 is a special purpose controller of control module 302. In an embodiment, controller 308 can be configured to perform some or all of the operations described above as being performed by synchronizer 210. In an embodiment, controller 308 can be configured to instruct synchronizer 210 to control elements of PIV system 100 based on instructions received from command center 310 (e.g., in an embodiment, instructions received from a user at command center 310). For example, in an embodiment, a user can send instructions to PIV system 100 via command center 310 instructing PIV system 100 to rotate cameras 208 in a specified direction. In an embodiment, controller 308 can receive these instructions and relay them to synchronizer 210, which can instruct cameras 208 to rotate accordingly. Components of control module 302 can be implemented using hardware, software, and/or a combination of hardware and software. Further, elements of control module 302 can be implanted using a single device within control module enclosure 108 or multiple separate devices each integrated within control module enclosure 108.

Figure 4:
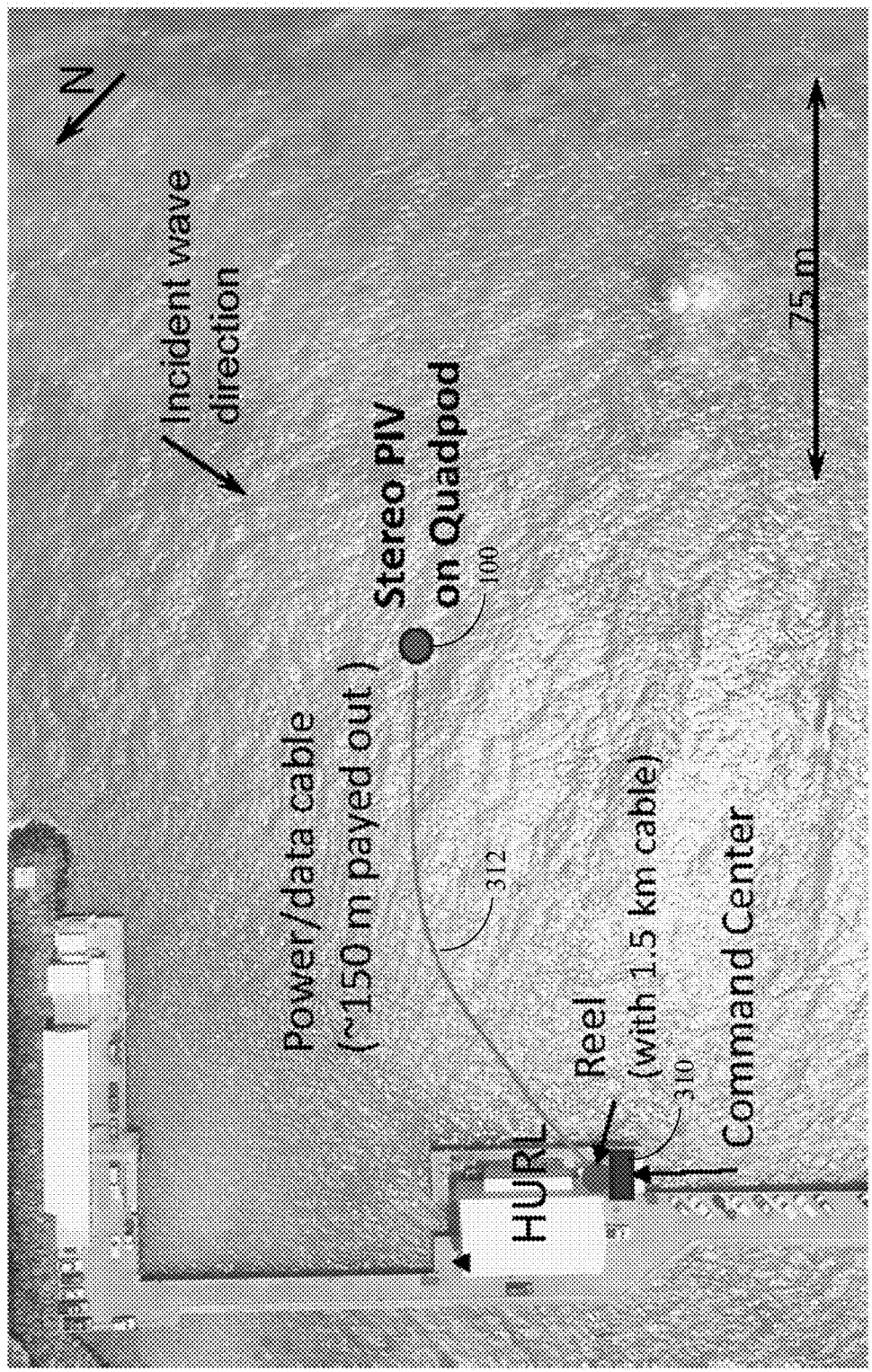
FIG. 4 is a diagram showing an exemplary deployment of a PIV system in accordance with an embodiment of the present disclosure.

FIG. 4 is a diagram showing an exemplary deployment of a PIV system in accordance with an embodiment of the present disclosure. In FIG. 4, PIV system 100 is deployed in a body of water and is coupled to command center 310 via umbilical cord 312. PIV system 100 can be used to collect PIV information in the surrounding area and relay the measured information back to command center 310 via umbilical cord 312.

5. Exemplary Enclosure Embodiments

Figure 5A:
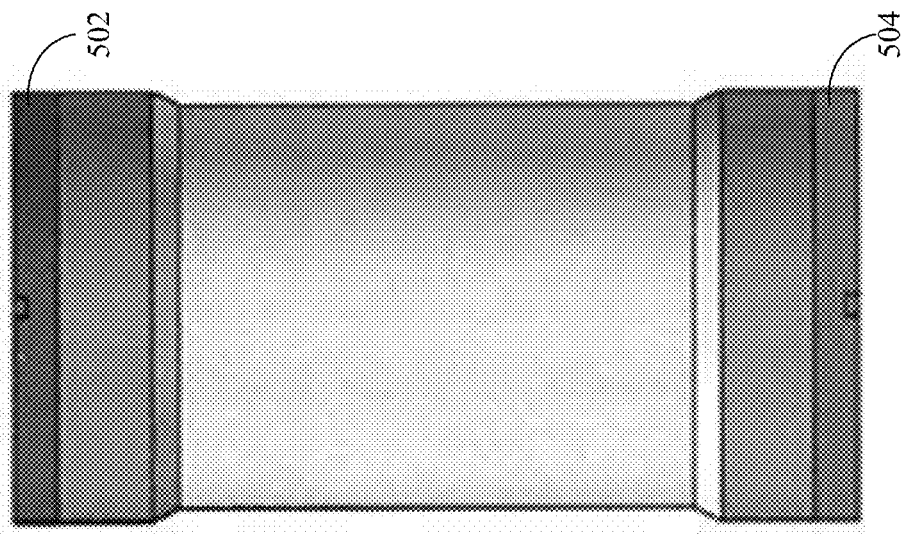
FIG. 5A is a diagram of an exterior of an exemplary enclosure in accordance with an embodiment of the present disclosure.
Figure 5B:
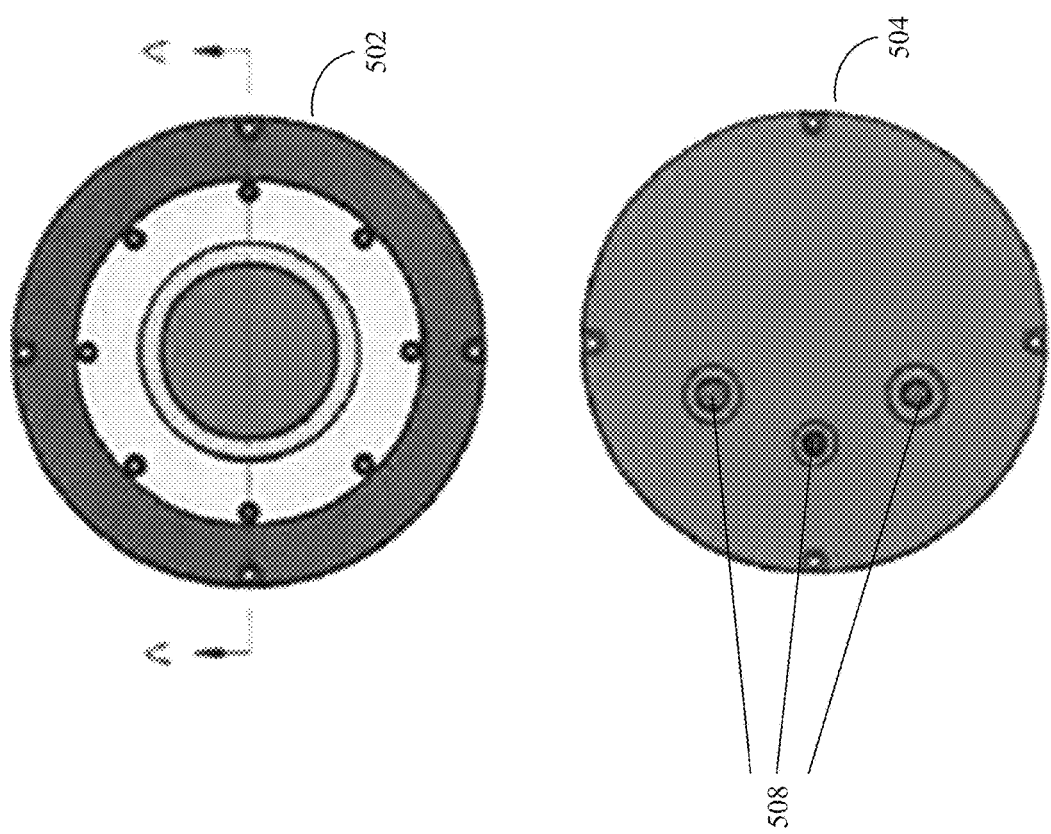
FIG. 5B is a diagram of exemplary end caps for an enclosure in accordance with an embodiment of the present disclosure.
Figure 5C:
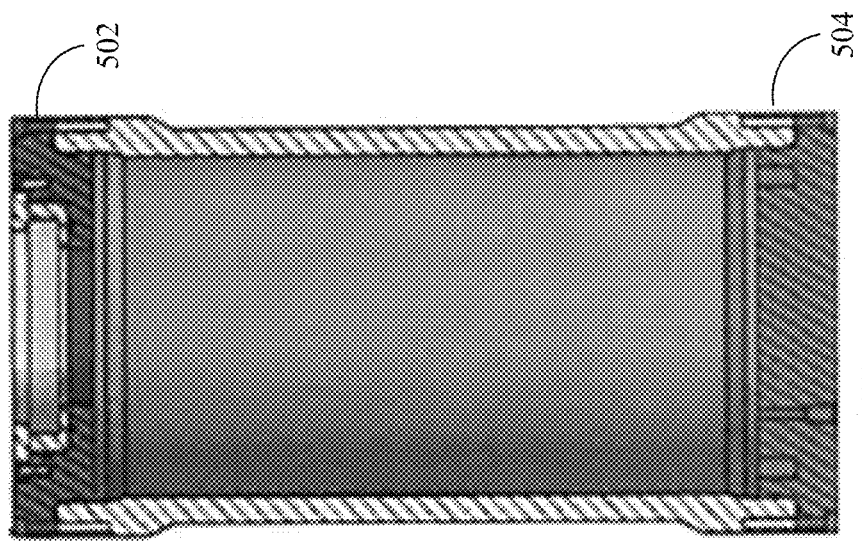
FIG. 5C is a diagram showing a cross section of an exemplary enclosure in accordance with an embodiment of the present disclosure.
Figure 5D:
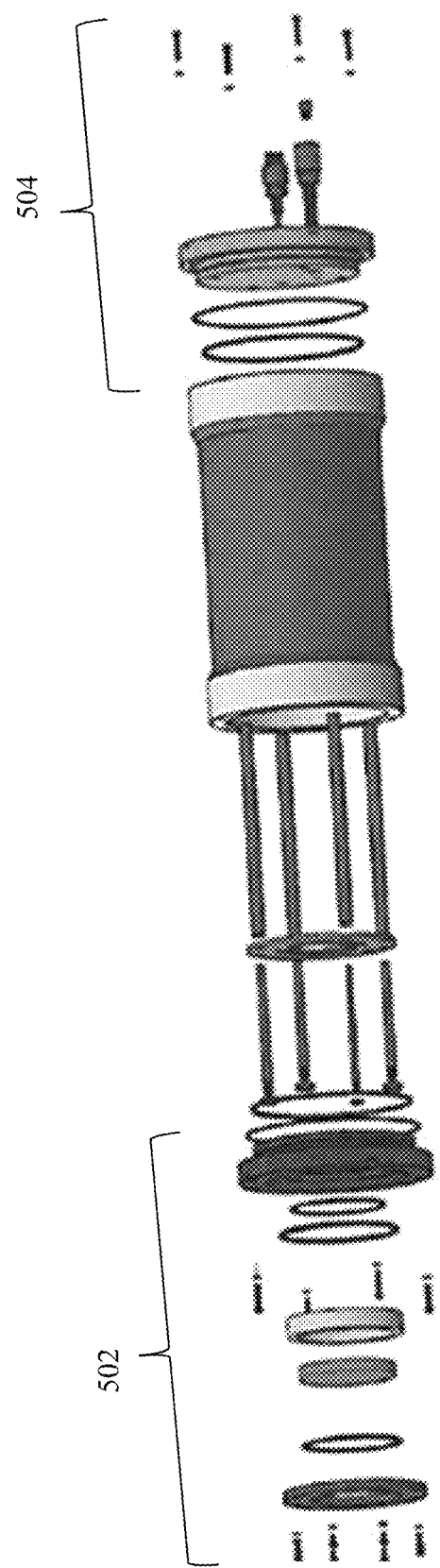
FIG. 5D is a diagram of parts used to assemble an exemplary enclosure in accordance with an embodiment of the present disclosure.

FIGS. 5A-5D are diagrams of an exemplary enclosure in accordance with an embodiment of the present disclosure. For example, in an embodiment, the enclosure of FIGS. 5A-5D can be used to implement camera enclosures 104, laser enclosure 106, and/or control module enclosure 108. FIG. 5A is a diagram of an exterior of an exemplary enclosure in accordance with an embodiment of the present disclosure. The enclosure of FIG. 5A has a first end cap 502 and a second end cap 504. FIG. 5B is a diagram of exemplary end caps for an enclosure in accordance with an embodiment of the present disclosure. FIG. 5B shows a top view of first end cap 502 and second end cap 504. FIG. 5B shows a plurality of pass-through connectors 508 (e.g., pass-through connectors for power, triggering, and control lines) for connecting control lines to interior components of the enclosure of FIGS. 5A-5D. For example, in an embodiment, control module 302 can send commands to the enclosure of FIGS. 5A-5D via pass-through connectors 508. One or both of end caps 502 and 504 can have pass-through connectors in accordance with embodiments of the present disclosure. FIG. 5C is a diagram showing a cross section of an exemplary enclosure in accordance with an embodiment of the present disclosure. FIG. 5D is a diagram of parts used to assemble an exemplary enclosure in accordance with an embodiment of the present disclosure.

In an embodiment, the enclosure of FIGS. 5A-5D is cast and/or machined with nickel aluminum bronze (e.g., C9550 nickel aluminum bronze). In an embodiment, nickel aluminum bronze is selected as a material as a compromise between anti-fouling properties, galvanic properties, corrosion resistance, cost, and thermal conductivity. In an embodiment, the enclosure of FIGS. 5A-5D has anodes on the aluminum circular plate and has dimensions minimized to reduce drag. In an embodiment, one or both of end caps 502 and 504 can have a cylinder flange designed to incorporate double O rings. For example, in FIGS. 5B-5D, first end cap 502 has a cylinder flange that incorporates double O rings. In an embodiment, the enclosure of FIGS. 5A-5D is evacuated using 20-25 inches of mercury (Hg) and back-filled dry using dinitrogen ($N_2$) to avoid internal condensation.

Figure 6A:
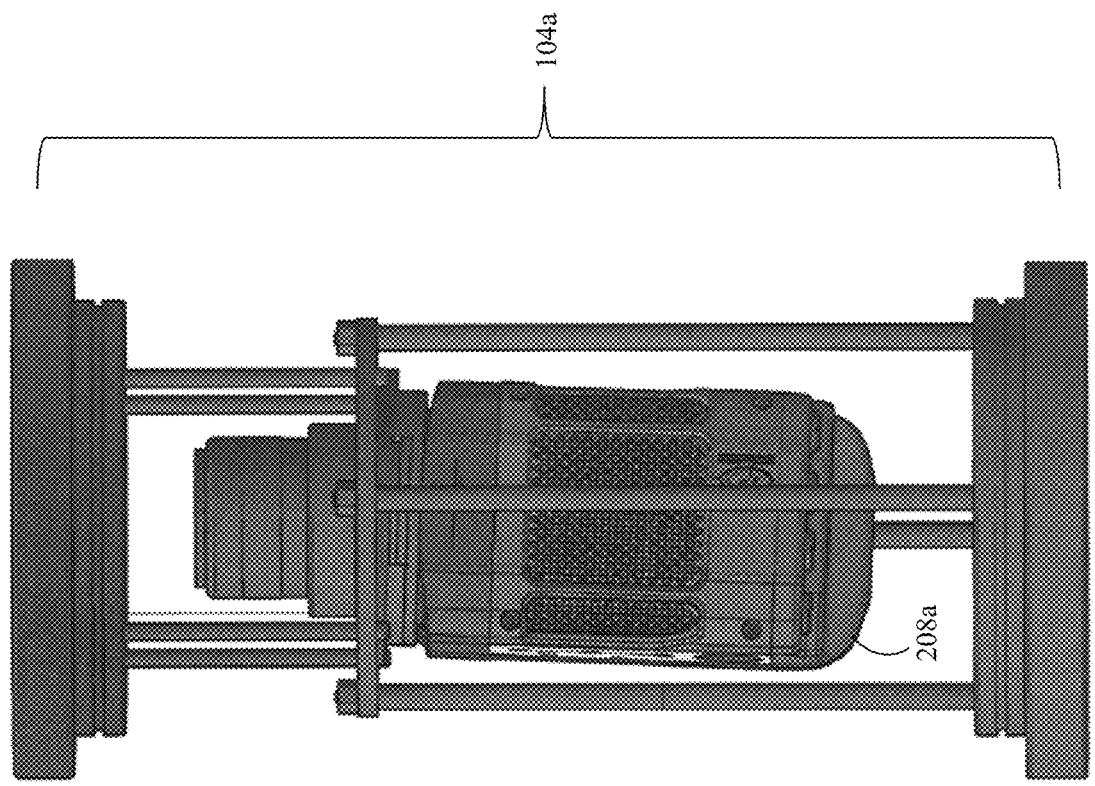
FIG. 6A shows an interior of an exemplary camera enclosure in accordance with an embodiment of the present disclosure.
Figure 6B:
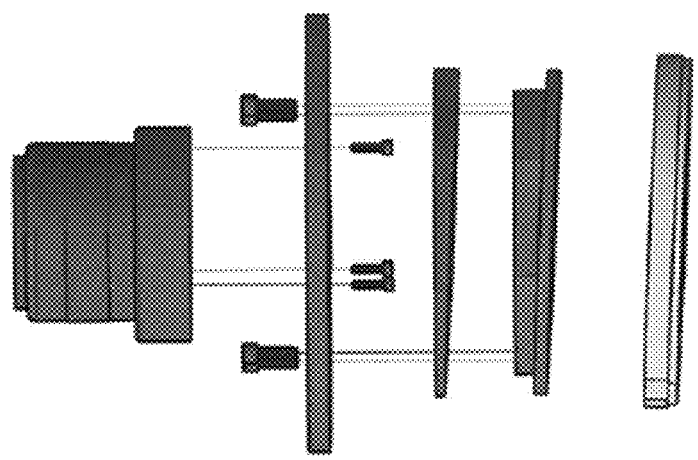
FIG. 6B shows a diagram of exemplary components used to secure a camera to a camera enclosure in accordance with an embodiment of the present disclosure.

FIG. 6A shows an interior of an exemplary camera enclosure in accordance with an embodiment of the present disclosure. For example, FIG. 6A shows an exemplary embodiment of camera enclosure 104a that encloses camera 208a. In an embodiment, camera 208a has a remote control lens focus and aperture, is compact, and is rotatable. FIG. 6B shows a diagram of exemplary components used to secure a camera to a camera enclosure in accordance with an embodiment of the present disclosure. For example, FIG. 6B shows a diagram of exemplary components used to secure camera 208a to camera enclosure 104a.

Figure 7A:
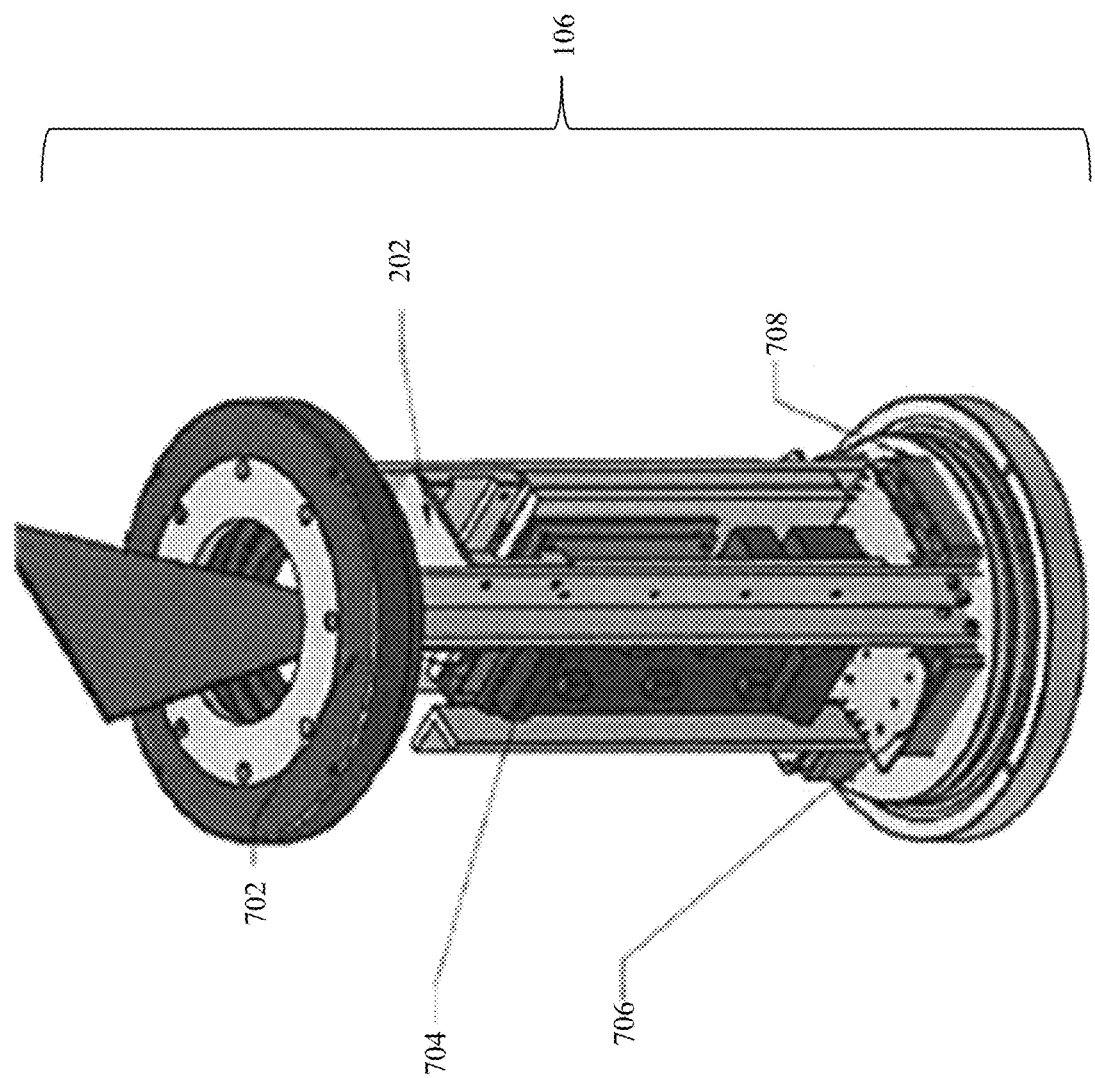
FIG. 7A is a diagram of an interior of an exemplary laser enclosure in accordance with an embodiment of the present disclosure.
Figure 7B:
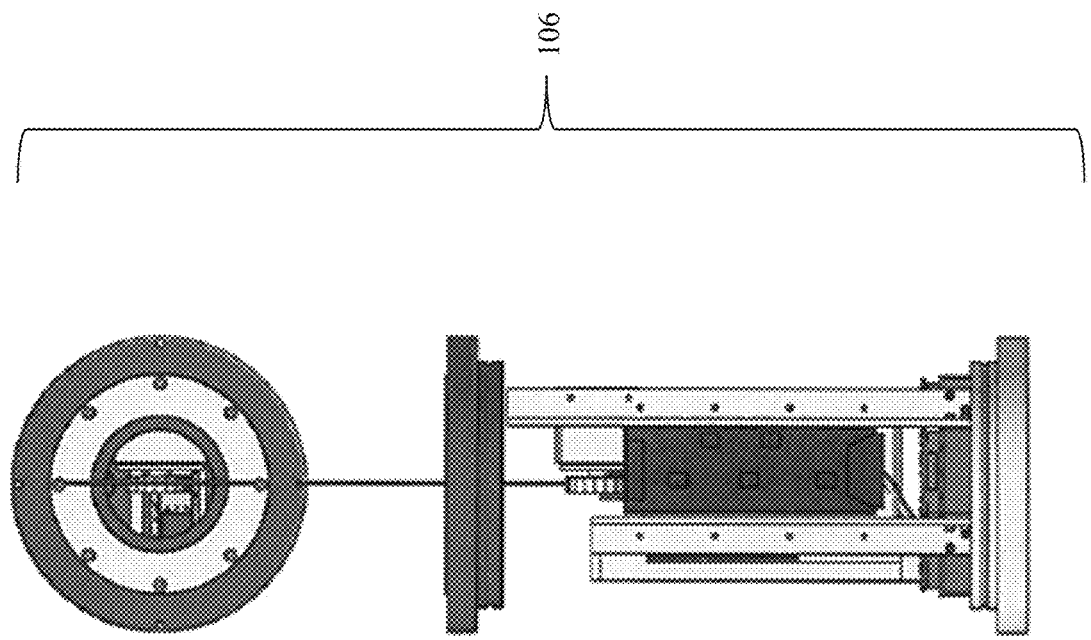
FIG. 7B is a diagram showing a front view of an exemplary laser enclosure in accordance with an embodiment of the present disclosure.
Figure 7C:
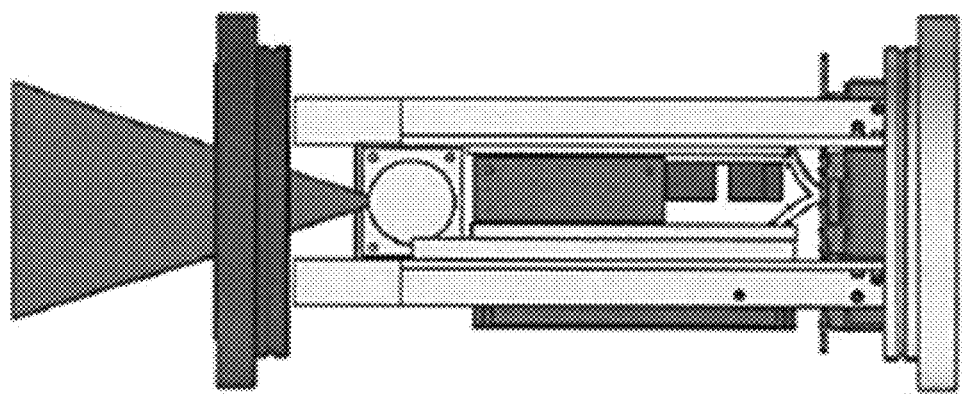
FIG. 7C is a diagram showing a first side view of an exemplary laser enclosure in accordance with an embodiment of the present disclosure.
Figure 7D:
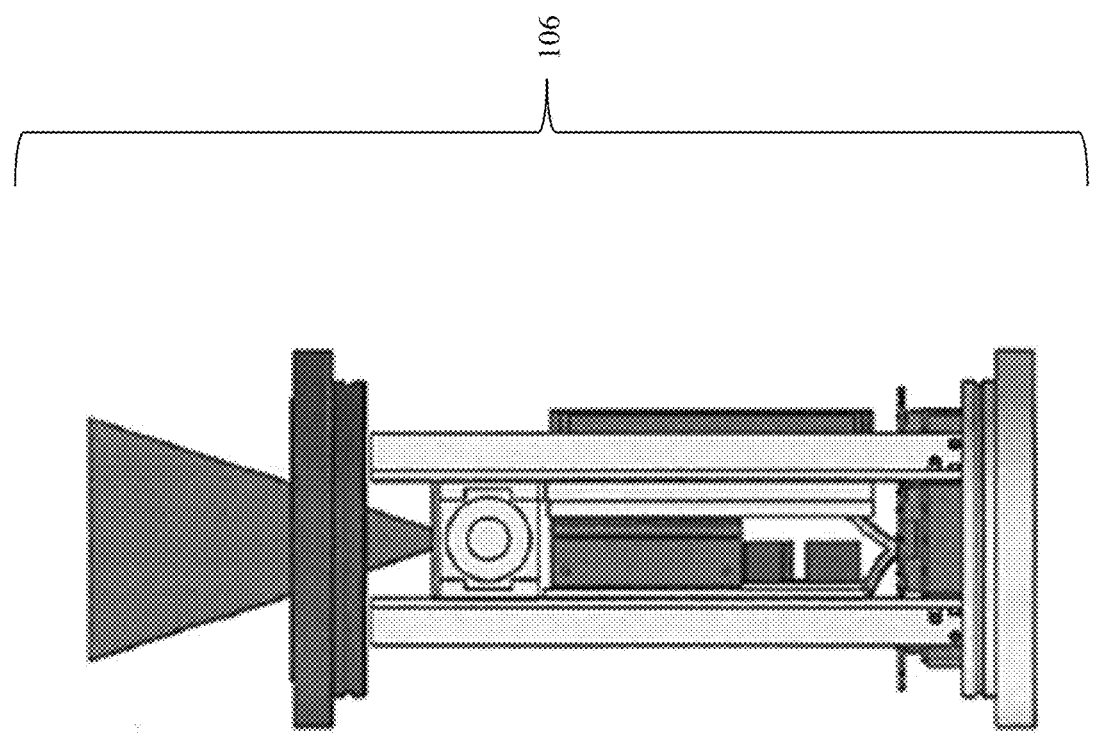
FIG. 7D is a diagram showing a second side view of an exemplary laser enclosure in accordance with an embodiment of the present disclosure.

FIGS. 7A-7D are diagrams of an exemplary laser enclosure in accordance with an embodiment of the present disclosure. For example, FIG. 7A is a diagram of an interior of an exemplary laser enclosure in accordance with an embodiment of the present disclosure. For example, FIG. 7A shows an exemplary embodiment of laser enclosure 106 that encloses laser 202. In addition to laser 202, the laser enclosure of FIG. 7A also includes a scanner 702, a printed circuit board (PCB) 704, a power supply PCB 706, and additional non-ferous metal for heat dispersion 708. FIG. 7B is a diagram showing a front view of an exemplary laser enclosure in accordance with an embodiment of the present disclosure. FIG. 7C is a diagram showing a first side view of an exemplary laser enclosure in accordance with an embodiment of the present disclosure. FIG. 7D is a diagram showing a second side view of an exemplary laser enclosure in accordance with an embodiment of the present disclosure.

I an embodiment, laser 202 is a continuous wave (CW) laser. In an embodiment, laser 202 is a DPSS Yttrium aluminium garnet (YAG) laser. I an embodiment, laser 202 is mounted so that the beam from laser 202 reflects onto multi-faceted rotating mirror 205 (e.g., in an embodiment, after reflecting off first mirror 203a, as described above with reference to FIG. 2). While mirrors 203 and 205 and sensor device 206 are not shown as being enclosed by laser enclosure 106 in FIGS. 7A-7D, it should be understood that, in an embodiment, laser enclosure 106 can also enclose mirrors 203 and 205 and sensor device 206.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A particle image velocimetry (PIV) device, the PIV device comprising:
    a plurality of legs;
    a turntable coupled to the plurality of legs;
    a laser enclosure coupled to the turntable, wherein the laser enclosure is configured to enclose:
        a multi-faceted rotating mirror configured to generate a laser sheet based on a first reflected laser beam, wherein the laser sheet is configured to illuminate a plurality of particles in a medium surrounding the PIV device,
        a laser configured to generate a first laser beam,
        a first mirror configured to reflect the first laser beam to the multi-faceted rotating mirror, thereby generating the first reflected laser beam,
        a second mirror configured to receive a portion of the laser sheet and to generate a second reflected laser beam, and
        a sensor device configured to receive the second reflected laser beam;
    a camera enclosure coupled to the turntable, wherein the camera enclosure is configured to enclose a camera, and wherein the camera is configured to:
        detect backscatter reflected from the plurality of particles, and
        generate an image based on the backscatter; and
    a control module enclosure configured to enclose a control module, wherein the control module is coupled to the sensor device and the camera, and wherein the control module is configured to synchronize the laser and the camera.

2. The PIV device of claim 1, further comprising:
    a second camera enclosure coupled to the turntable, wherein the second camera enclosure is configured to enclose a second camera, and wherein the control module is configured to synchronize the laser, the camera, and the second camera.

3. The PIV device of claim 1, wherein the control module is further configured to control a rotation of the turntable.

4. The PIV device of claim 1, wherein the control module comprises a synchronizer, wherein the synchronizer is coupled to the sensor device and the camera, and wherein the synchronizer is configured to synchronize the laser and the camera.

5. The PIV device of claim 1, wherein the sensor device is configured to send a signal to the control module based on the second reflected laser beam, wherein the camera is configured to transmit the image to the control module, and wherein the control module is configured to synchronize the laser and the camera based on the signal and the image.

6. The PIV device of claim 1, wherein the camera comprises a plurality of lenses, and wherein the control module is configured to control operation of the plurality of lenses.

7. The PIV device of claim 6, wherein the plurality of lenses comprise an aperture lens and a focus lens.

8. The PIV device of claim 1, wherein the control module is configured to:
    instruct the laser to generate the first laser beam; and
    instruct the camera to detect the backscatter.

9. A device, comprising:
    a laser, enclosed by a first pressure vessel, wherein the laser is configured to generate a laser beam that illuminates a plurality of particles in a medium surrounding the device;
    a camera, enclosed by a second pressure vessel, wherein the camera is configured to:
        detect backscatter reflected from the plurality of particles, and
        generate an image based on the backscatter; and
    a control module, coupled to the laser and the camera, wherein the control module is enclosed by a third pressure vessel, and wherein the control module is configured to synchronize the laser and the camera.

10. The device of claim 9, wherein the laser beam is a two dimensional laser sheet.

11. The device of claim 9, wherein the medium is water.

12. The device of claim 9, further comprising a second camera coupled to the control module, wherein the control module is further configured to synchronize the camera, the second camera, and the laser.

13. The device of claim 9, further comprising a rotating mirror coupled to the laser, wherein the laser is configured to generate a first laser beam, wherein the first laser beam is reflected off the rotating mirror to generate the laser beam that illuminates the plurality of particles in the medium surrounding the device.

14. The device of claim 9, wherein the device is located underwater, and wherein the device further comprises:
   an umbilical cable coupled to the control module and to a source above water, wherein the umbilical cable is configured to deliver power and data to the device from the source.

15. A system for particle image velocimetry (PIV), the system comprising:
   an particle image velocimetry (PIV) device located below water, the PIV device comprising:
      a plurality of legs;
      a turntable coupled to the plurality of legs;
      a laser enclosure coupled to the turntable, wherein the laser enclosure is configured to enclose:
         a multi-faceted rotating mirror configured to generate a laser sheet based on a first reflected laser beam, wherein the laser sheet is configured to illuminate a plurality of particles in a medium surrounding the PIV device,
         a laser configured to generate a first laser beam,
         a first mirror configured to reflect the first laser beam to the multi-faceted rotating mirror, thereby generating the first reflected laser beam,
         a second mirror configured to receive a portion of the laser sheet and to generate a second reflected laser beam, and
      a sensor device configured to receive the second reflected laser beam;
      a camera enclosure coupled to the turntable, wherein the camera enclosure is configured to enclose a camera, and wherein the camera is configured to:
         detect backscatter reflected from the plurality of particles, and
         generate an image based on the backscatter; and
      a control module enclosure configured to enclose a control module, wherein the control module is coupled to the sensor device and the camera, and wherein the control module is configured to synchronize the laser and the camera;
   an umbilical cord coupled to the PIV device, wherein the umbilical cord is configured to send power and data to the PIV device; and
   a command center device, coupled to the umbilical cord, wherein the command center device is located above water.

16. The system of claim 15, wherein the command center device is configured to receive the image from the camera via the umbilical cord.

17. The system of claim 15, wherein the command center device is configured to send a signal, via the umbilical cord, to the control module, wherein the signal instructs the control module to control an operation of the PIV device.

18. The system of claim 17, wherein the signal instructs the control module to focus the camera.

19. The system of claim 17, wherein the signal instructs the control module to rotate the first mirror, the second mirror, or the multi-faceted rotating mirror.

20. The system of claim 17, wherein the PIV device further comprises:
   a second camera enclosure coupled to the turntable, wherein the second camera enclosure is configured to enclose a second camera, and wherein the control module is configured to synchronize the laser, the camera, and the second camera.

* * * * *